A. G. MEADOR.
DRAFT EQUALIZER.
APPLICATION FILED MAY 8, 1920.

1,419,881. Patented June 13, 1922.

WITNESS:
E. R. Ruppert.

A. G. Meador
INVENTOR

BY Victor J. Evans
ATTORNEY

UNITED STATES PATENT OFFICE.

ARTHUR G. MEADOR, OF CLOVIS, NEW MEXICO.

DRAFT EQUALIZER.

1,419,881.  Specification of Letters Patent.  Patented June 13, 1922.

Application filed May 8, 1920. Serial No. 379,365.

*To all whom it may concern:*

Be it known that I, ARTHUR G. MEADOR, a citizen of the United States, residing at Clovis, in the county of Curry and State of New Mexico, have invented new and useful Improvements in Draft Equalizers, of which the following is a specification.

The present invention has reference to a draft equalizer designed especially for use in connection with farm implements in which draft animals are attached to one side of the operating part of the improvement, and is designed to prevent side draft.

A further object is to produce a device of this character which may be attached to any ordinary construction of implements or machines, which shall be of a simple construction, and which shall be thoroughly efficient for the purpose for which it is devised.

The foregoing, and other objects which will appear as the nature of the invention is better understood, may be accomplished by a construction, combination and operative arrangement of parts, such as is disclosed by the drawings.

In the drawings:—

Figure 1:
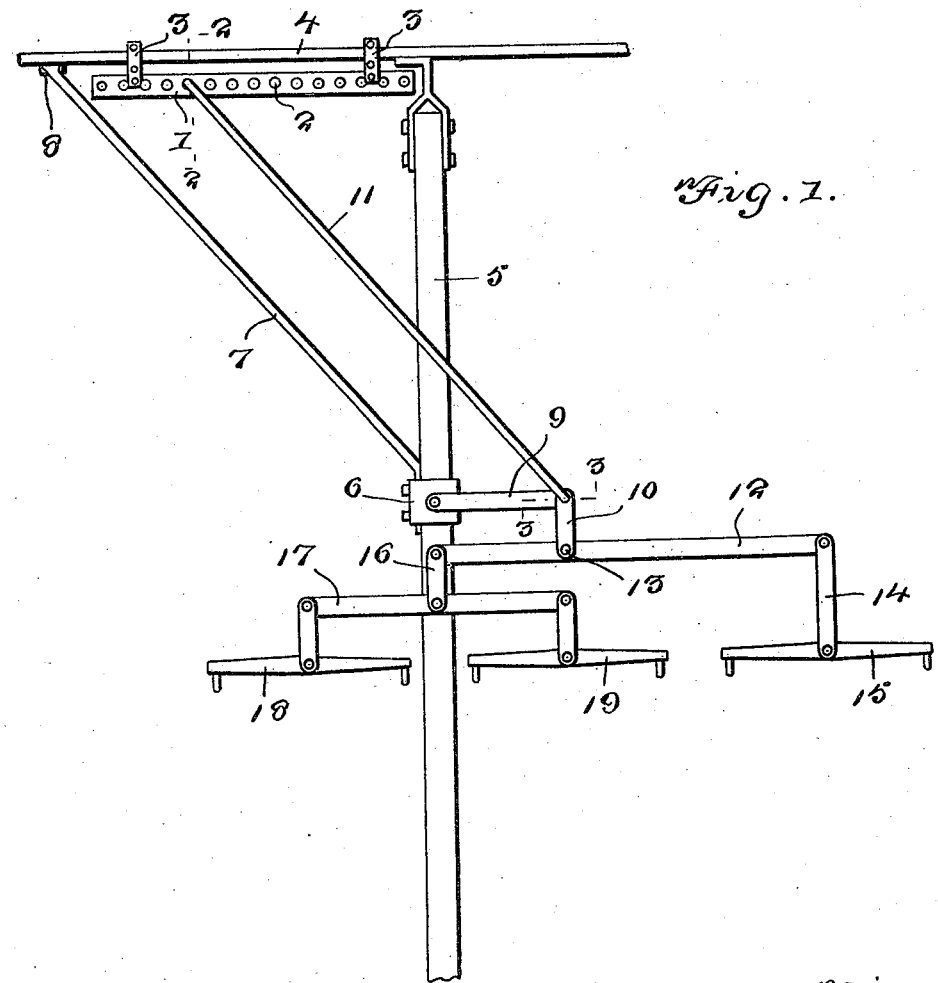
Figure 1 is a plan view illustrating the application of the improvement.
Figure 2:
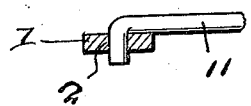
Figure 2 is a sectional view approximately on the line 2—2 of Figure 1.
Figure 3:
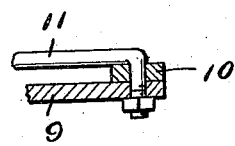
Figure 3 is a sectional view approximately on the line 3—3 of Figure 1.

In carrying out my invention I make use of a bar 1 that is provided throughout its length with a series of apertures 2. To the bar there are pivotally connected clips 3—3 which are fastened to the hitch side of a machine 4. Loosely connected to the bar 4 is the tongue 5. On the tongue 5 is a bracket 6 that carries a rod 7 that is attached, as at 8 to the bar 4. Swiveled on the bracket 6 is an angularly arranged arm 9. To the outer end of the arm 9 is a clevis 10. Also on the outer end there is pivotally connected a rod 11 that has its free end offset or provided with a hook that passes through one of the apertures 2 in the bar 1. To the clevis 10 there is pivoted a span or draw bar 12. The pivot 13 connecting the clevis to the draw bar enters the said bar off of the center thereof, and on the end of the bar 12 farthest away from the pivot there is a clevis 14 to which is connected a single tree 15. The opposite end of the bar 12 is arranged over the tongue 5 and is provided with a clevis 16 to which there is centrally pivoted a tree 17 having at its ends single trees 18 and 19.

It will be noted that the single tree 18 is disposed to one side of the tongue 15, while the single trees 19 and 15 are disposed to opposite and outer side of the tongue. By this arrangement a proper equalization of draft is obtained and the single horse connected to the single tree 18 at one side of the tongue, and nearest to the machine 4, will have no more work to do than the two horses on the opposite side of the pole.

Having thus described the invention, what I claim, is:—

In combination with a side draft implement having a tongue pole secured thereto; of a bracket on the tongue, an angularly disposed rod carried by the bracket and secured to the implement, an apertured bar removably secured to the implement between the tongue and rod, an arm pivoted on the bracket, a rod having angle ends, one of which is received in one of the apertures of the bar and the other passing through the outer end of the arm, a link resting on said outer end of the bar and through which the last mentioned angle end of the rod passes, means on the said end of the rod securing the same on the arm, a draw bar pivotally connected off of its center to the outer end of the link, and single and double trees connected to the draw bar.

In testimony whereof I affix my signature.

ARTHUR G. MEADOR.